(12) United States Patent
Kamikawa

(10) Patent No.: US 8,764,287 B2
(45) Date of Patent: Jul. 1, 2014

(54) THERMAL DETECTOR, THERMAL DETECTING DEVICE, AND ELECTRONIC INSTRUMENT

(75) Inventor: Taketomi Kamikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 445 days.

(21) Appl. No.: 13/013,084

(22) Filed: Jan. 25, 2011

(65) Prior Publication Data

US 2011/0182322 A1 Jul. 28, 2011

(30) Foreign Application Priority Data

Jan. 26, 2010 (JP) ................................ 2010-014670

(51) Int. Cl.
*G01J 5/02* (2006.01)
*G01J 5/34* (2006.01)
*G01J 5/20* (2006.01)

(52) U.S. Cl.
CPC .. *G01J 5/20* (2013.01); *G01J 5/023* (2013.01); *G01J 5/02* (2013.01); *G01J 5/34* (2013.01)
USPC ............ 374/121; 250/338.1; 438/54; 438/57; 374/178

(58) Field of Classification Search
USPC ......... 374/121, 141, 152, 208, 179, 178, 185; 250/338.1; 438/54, 57
See application file for complete search history.

(56) References Cited

U.S. PATENT DOCUMENTS

| 4,445,034 | A * | 4/1984 | Tomita et al. ............... 250/338.3 |
|---|---|---|---|
| 6,441,374 | B1 * | 8/2002 | Kawano et al. ............. 250/338.1 |
| 6,489,614 | B1 * | 12/2002 | Deguchi et al. ............ 250/338.1 |
| 7,180,063 | B2 * | 2/2007 | Wada et al. ................. 250/338.1 |
| 7,655,909 | B2 * | 2/2010 | Schimert et al. ........... 250/338.1 |
| 7,718,965 | B1 * | 5/2010 | Syllaios et al. ............. 250/338.1 |
| 8,017,911 | B2 * | 9/2011 | Tailhades et al. ............. 250/340 |
| 8,067,736 | B2 * | 11/2011 | Gruss et al. ................ 250/336.1 |
| 8,247,771 | B2 * | 8/2012 | Ouvrier-Buffet .......... 250/338.1 |
| 2002/0034878 | A1 | 3/2002 | Kimata et al. |
| 2003/0168698 | A1 * | 9/2003 | Shin et al. ...................... 257/335 |
| 2003/0209668 | A1 * | 11/2003 | Tohyama .................... 250/338.1 |
| 2006/0038129 | A1 * | 2/2006 | Watanabe ................... 250/338.1 |
| 2007/0095380 | A1 * | 5/2007 | Dewes et al. .................. 136/224 |
| 2007/0116086 | A1 * | 5/2007 | Massoni et al. ............... 374/121 |
| 2009/0242768 | A1 * | 10/2009 | Tohyama .................... 250/338.3 |

(Continued)

FOREIGN PATENT DOCUMENTS

| JP | 2000-356545 A | 12/2000 |
|---|---|---|
| JP | 2002-299596 A | 10/2002 |

(Continued)

*Primary Examiner* — Gail Verbitsky
(74) *Attorney, Agent, or Firm* — Global IP Counselors, LLP

(57) ABSTRACT

A thermal detector includes a thermal detecting element and a support member supporting the thermal detecting element and a wiring layer. The support member has an arm member connected to a mounting member with the first arm member having an arm base end section extending outwardly from the mounting member toward a first direction, the arm base section having a first width measured along a direction perpendicular to the first direction, and an arm body section having a proximal end portion extending from the arm base end section generally along an outer contour of the mounting member with the proximal end portion being spaced apart from an edge of the mounting member in the first direction. The proximal end portion of the arm body section has a second width measured along a direction perpendicular to a lengthwise direction of the arm body section that is narrower than the first width.

19 Claims, 5 Drawing Sheets

(56) References Cited

U.S. PATENT DOCUMENTS

| | | | |
|---|---|---|---|
| 2011/0110394 A1* | 5/2011 | Kaess et al. | 374/121 |
| 2011/0155913 A1* | 6/2011 | Noguchi et al. | 250/338.3 |
| 2011/0180711 A1* | 7/2011 | Tsuchiya | 250/338.4 |
| 2011/0266445 A1* | 11/2011 | Beratan | 250/338.4 |
| 2012/0163410 A1* | 6/2012 | Tsuchiya | 374/121 |

FOREIGN PATENT DOCUMENTS

| | | |
|---|---|---|
| JP | 2007-071885 A | 3/2007 |
| JP | 2008-232896 A | 10/2008 |
| JP | 2008-300892 A | 12/2008 |
| JP | 2008-311683 A | 12/2008 |
| JP | 2009-031197 A | 2/2009 |

* cited by examiner

THERMAL DETECTOR, THERMAL DETECTING DEVICE, AND ELECTRONIC INSTRUMENT

CROSS-REFERENCE TO RELATED APPLICATIONS

This application claims priority to Japanese Patent Application No. 2010-014670 filed on Jan. 26, 2010. The entire disclosure of Japanese Patent Application No. 2010-014670 is hereby incorporated herein by reference.

BACKGROUND

1. Technical Field

The present invention relates to an infrared detector or other thermal detector, a thermal detecting device, and an electronic instrument.

2. Related Art

A known type of thermal detecting device is a pyroelectric or bolometric infrared detection device. The infrared detection device detects infrared radiation by absorbing heat in the form of infrared radiation with an infrared absorbing film and detecting an electromotive force generated (pyroelectric) or a change of a resistance value (bolometric) in a thermal infrared detection element. The infrared detection element is supported by a support member and a hollow section is formed between the support member and a substrate for thermal isolation.

From the perspective of reducing the amount of heat dissipation from the thermal infrared detection element, a support arm section that connects the support member to the substrate is configured to be narrow and elongated to reduce thermal conductance and decrease heat capacity. However, the support arm will not have sufficient strength if it is too narrow. If the strength is insufficient, then the support member may adhere and become stuck (sticking) to a bottom surface of the hollow section during manufacturing or the orientation of the detection element may change during use and cause a light capturing efficiency to decline.

Therefore, such ideas as configuring the support arm to have a cross-sectional shape that is curved or has chamfered corners in order to relieve stress in the support arm (Japanese Laid-Open Patent Publication No. 2009-31197) or configuring the support arm to have a step-shaped circumferential change or undercut that increases a second moment of inertia of the support arm and thus increases a bending strength of the support arm (Japanese Laid-Open Patent Publication No. 2007-71885).

SUMMARY

Changing the shape of an outer contour (outline) in a plan view can be accomplished easily using photolithographic patterning, which is a conventional technique used in semiconductor manufacturing. However, even if a sacrificial layer is fabricated for forming the hollow section and isotropic etching is used to form the support arm, it is difficult to form the shape of a step-shaped change or an undercut in a cross sectional view as shown in Japanese Laid-Open Patent Publication No. 2007-71885 and an increased number of manufacturing steps is required to mask only the portion where the support arm will be formed and execute the isotropic etching.

Additionally, from the perspective of forming wiring (a conductor) on the support arm connecting to the thermal detecting element, there has been a need to improve the support arm in relation to dissipation of heat conducted through the wiring, breakage of wiring, ensuring sufficient strength, and heat transfer.

With several aspects of the present invention, it is possible to provide a thermal detector, a thermal detecting device, and an electronic instrument in which a strength of an arm is increased, heat dissipation from the arm is decreased, and breakage of wiring in the arm can be prevented.

A thermal detector according to one aspect of the present invention includes a thermal detecting element, a support member and a wiring layer. The support member supports the thermal detecting element. The support member has a mounting member on which the thermal detecting element is mounted and a first arm member connected to the mounting member. The first arm member has an arm base end section and an arm body section. The arm base end section extends outwardly from the mounting member toward a first direction. The arm base section has a first width measured along a direction perpendicular to the first direction. The arm body section has a proximal end portion extending from the arm base end section generally along an outer contour of the mounting member with the proximal end portion being spaced apart from an edge of the mounting member in the first direction. The proximal end portion of the arm body section has a second width measured along a direction perpendicular to a lengthwise direction of the arm body section with the second width being narrower than the first width of the arm base end section. The wiring layer is formed on the mounting member and the first arm member and connected to the thermal detecting element.

In this aspect of the present invention, since the arm is configured such that the arm base end section connected to the mounting member has a larger first width, the strength of the arm can be increased by the first width of the arm base end section while still reducing the thermal conductance of the arm by configuring the arm body section to have a narrower second width. For example, even if an external force acts on the arm base end section due to extension and contraction of the arm caused by vibrations or temperature changes, the arm base end section can withstand the external force due to the strength imparted by the larger first width and damage can be prevented. As a result, the reliability of the detector is improved.

Additionally, since the proximal end portion is spaced apart from an edge of the mounting member in the first direction in which the arm base end section extends from the mounting member, the wiring layer is arranged to change directions at an intermediate position between the arm base end section and the arm body section and thus is longer than it would otherwise be. As a result, heat dissipation through the wiring layer can be reduced.

Additionally, even if an outer contour of the mounting member is configured to have a substantially similar shape to an outer contour of the thermal detecting element, substantially the entire mounting member can be occupied by the thermal detecting element because a direction in which the wiring is oriented can be changed at the arm base end section, which bulges from the mounting member. As a result, a light capturing surface area per cell can be increased and a sensitivity of the thermal detector can be increased.

In this aspect of the present invention, the thermal detector can be further provided with a substrate supporting a distal end portion of the arm body section of the first arm member such that a hollow section is formed between the substrate and the support member. As a result, the support member can be thermally isolated from the substrate.

In this aspect of the present invention, the thermal detector can be further provided with a second arm member and the wiring layer is provided at least on the first arm member. Thus, the wiring layer can be provided on both of the two arms or consolidated into one of the arms.

In this aspect of the present invention, the second arm member having an arm base end section can extend from the mounting member and be disposed in such a position as to be point symmetrical from the arm base end section of the first arm member with respect to a center of the mounting member.

Thus, since each of the two arms has an arm body section that extends along the mounting member from an arm base end section arranged to be point symmetrical with respect to a center of the mounting member, the lengths of the two arms and the wiring layer can be maximized. As a result, the thermal conductance can be minimized. Furthermore, when the arms extend and contract due to, for example, temperature changes, moments develop which tend to cause the mounting member to rotate in opposite directions in a plan view. Since the opposing rotational moments counteract each other, the infrared detection element on the mounting member will not shift out of position so long as the arm base end sections do not fail.

In this aspect of the present invention, the wiring layer can include a wider width portion connected to the thermal detecting element and arranged on the arm base end section, and a narrower width portion connected to the wider width portion, arranged on the arm body section, and has a width narrower than a width of the wider width portion.

Since the arm base end section has a wider first width, a wider width portion having a wider width can be formed on the arm base end section and a narrower width portion having a narrower width can be formed on the arm body section, which has a narrower second width. Since the thermal detector is laminated (layered) onto the mounting member, there are cases in which the wiring is arranged on a portion where a step-shaped portion exists due to the lamination. However, a broken severed wire (conductor) can be prevented because the width of the wider width portion is wide. Moreover, the thermal conductance of the wiring layer is not large because the thermal conductance of the wiring layer is dominated by the narrower width portion, which has the narrower width.

In this aspect of the invention, the thermal detecting element can include a multi-layer structure protruding from the support member and including an upper electrode, an insulating film covering a portion of the support member and a side surface and a top surface of the multi-layer structure and having an opening formed in the top surface so as to expose the upper electrode, and an electrode contact filling the opening and connecting to the upper electrode. The wider width portion is connected to the electrode contact and extending to the arm base end section of the first arm member through a slanted surface of the insulating film and a step-shaped section between the insulating film and the support member.

Since the wider width portion extending to the arm base end section through a slanted surface of the insulating film and a step-shaped section between the insulating film and the support member has a larger width, the likelihood that a severed connection will occur in the wider width portion is reduced.

In this aspect of the present invention, the mounting member can have a polygonal shape with at least four sides in a plan view, the arm base end section of the first arm member can extend perpendicular to one side of the polygonal shape, and the proximal end portion of the arm body section of the first arm member can extend in a direction parallel to the one side of the polygonal shape. As a result, the extension directions of the wider arm base end section and the narrower arm body section intersect perpendicularly.

In this aspect of the present invention, the mounting member can have a curved outline in a plan view, and the arm base end section of the first arm member can have a wide region having the first width so that the wide region spans between the curved outline of the mounting member and an outside outline of the first arm member. Thus, it is acceptable for an outline of the mounting member to be a circle or other curved shape.

In this aspect of the present invention, the mounting member has a circular outline in a plan view, and the outside outline of the first arm member and the circular outline of the mounting member can be concentric with each other. In this way, the outline of the thermal detector per cell is circular and a surface area efficiency of the thermal detector per cell can be increased.

In this aspect of the present invention, an angular range in which the arm base end section is formed with respect to a center of the mounting member in a plan view can be set to less than 90 degrees. In this way, an angular range in which the arm body section is formed can be set to 90 degrees or larger and a length of the arm body section can be secured such that the thermal conductance is reduced.

In this aspect of the present invention, the mounting member can at least partially have a curved outline in a plan view, the arm base end section of the first arm member can have a wide region having the first width so that the wide region spans between the curved outline of the mounting member and an outside outline of the first arm member, and the arm body section of the second arm member can include a portion extending generally along an outline of the arm base end section of the first arm member. As a result, the thermal conductance can be reduced because the arm body section is provided with length.

In this aspect of the present invention, the outside outline of the first arm member can include two straight lines that intersect at the arm base end section. The arm body section of the second arm member can have a portion extending generally along one of the two straight lines of the outside outline of the first arm member. Thus, by providing the arm with straight line portions, the arm body section can be ensured to have length and the thermal conductance can be reduced.

A thermal detecting device according to another aspect of the present invention comprises a plurality of the previously described thermal detectors arranged in a two-dimensional array along directions parallel to two perpendicular axes. With this thermal detecting device, a light (temperature) image can be provided. Furthermore, if the surface area efficiency of a single-cell thermal detector is high, then a precise image can be provided.

An electronic device according to still another aspect of the present invention has a thermal detector or a thermal detecting device according to the previously explained aspects and is well suited to a thermographic instrument configured to acquire a light (temperature) distribution image, a night vision instrument installed in a vehicle, a monitoring camera, an analysis instrument (measuring instrument) configured to analyze (measure) physical information with respect to an object, a security instrument configured to detect a fire or heat, or an FA (factory automation) instrument provided in a factory.

BRIEF DESCRIPTION OF THE DRAWINGS

Referring now to the attached drawings which form a part of this original disclosure.

DETAILED DESCRIPTION OF EXEMPLARY EMBODIMENTS

A preferred embodiment of the present invention will now be explained in detail. The embodiment explained hereinafter does not unduly limit the content of the present invention as presented in the claims, and not all of the features explained in the embodiments are essential for achieving the object of the present invention.

1. First Embodiment 1.1. Overall Structure of Infrared Detector

Figure 1:
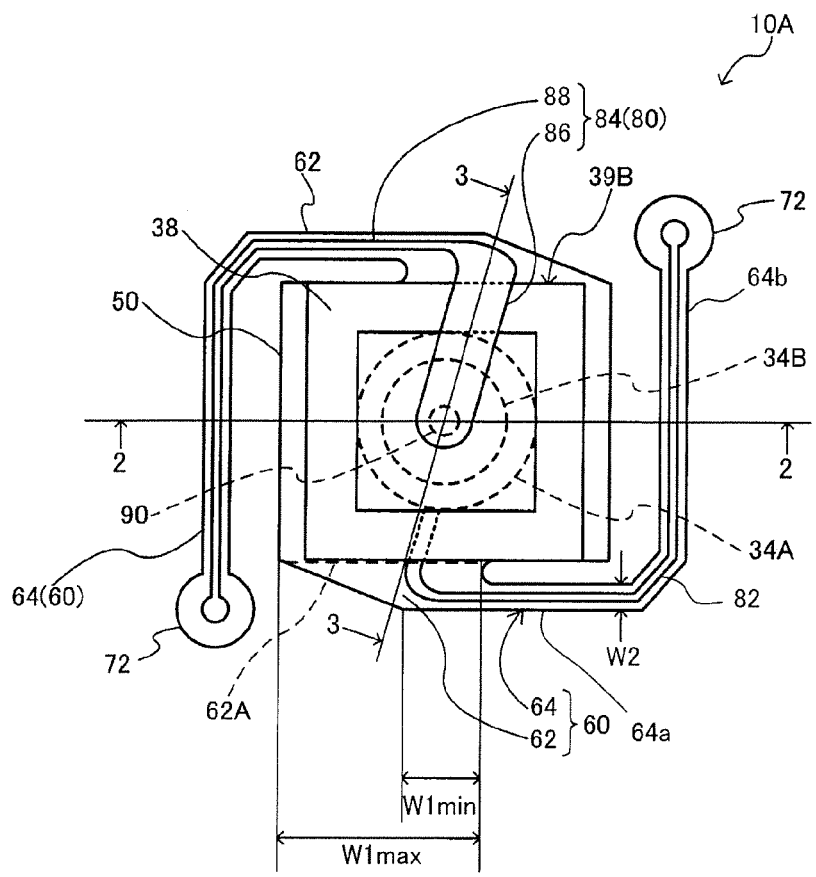
FIG. 1 is a plan view showing a planar layout of a support member and wiring of an infrared detector according to a first embodiment of the present invention.
Figure 2:
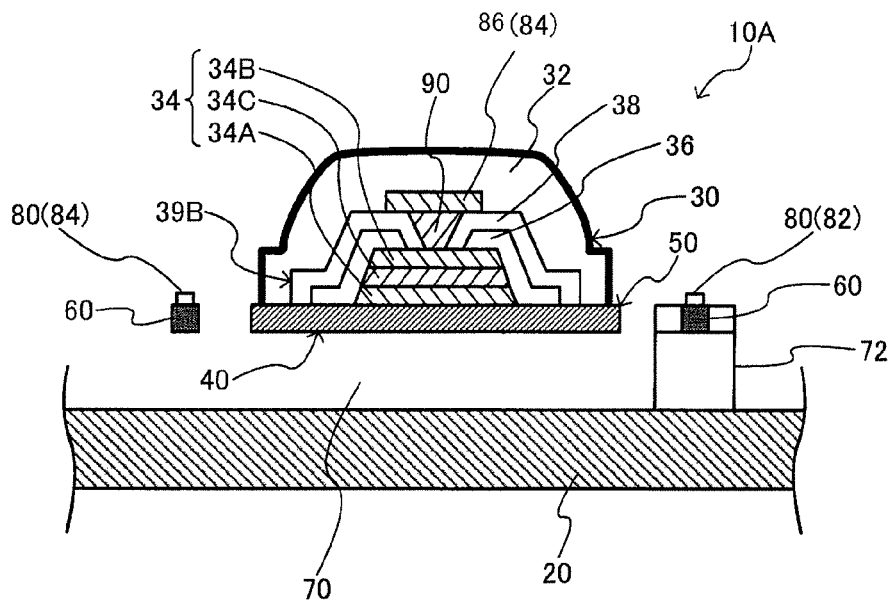
FIG. 2 is a cross sectional view taken along a section line 2-2 of FIG. 1.

FIG. 1 is a plan view of an infrared detector according to a first embodiment of a thermal detector according to the present invention and shows a planar layout of a support member and wiring. FIG. 2 is a cross sectional view taken along a section line 2-2 of FIG. 1. The infrared detector 10A corresponds to one cell and a plurality of such one-cell infrared detectors 10A arranged on a substrate in a two-dimensional arrange along directions parallel to two perpendicular axes can constitute an infrared detecting device.

As shown in FIGS. 1 and 2, the infrared detector 10a includes a substrate 20, an infrared detecting element (one example of a thermal detecting element) 30 that includes an infrared absorbing film (one example of a light absorbing film) 32, and a support member (membrane) 40 that supports the infrared detecting element 30. The substrate 20 and the support member 40 are thermally isolated from each other by a hollow section 70. The infrared detecting element 30 is mounted on a second surface (upper surface in FIG. 2) of the support member 40, which is opposite a first surface (lower surface in FIG. 2) that faces the hollow section 70.

The infrared detecting device 10A is contrived such that incident infrared radiation is absorbed by the infrared absorbing film 32 and heat generated by the absorbed infrared radiation causes an electromotive force to be generated or a resistance value to change in the infrared detecting element 30, thereby enabling infrared radiation to be detected. The hollow section 70 exists between the support member 40 on which the infrared detecting element 30 is mounted and the substrate 20, which has a large heat capacity. As a result, the infrared detecting element 30 and the substrate 20 are thermally isolated from each other and infrared radiation can be detected with few thermal losses.

More specifically, the support member 40 can have a mounting member 50 on which the infrared detecting element 30 is mounted and at least one arm 60 (one example of a first arm member) is connected to the mounting member 50 at one end and supported on the substrate 20 at the other end. In this embodiment, the two arms, e.g., first and second arms 60, are arranged in such positions as to be point symmetrically with respect to a center of the mounting member 50. Wiring layers 80 (82 and 84) connecting to the thermal detecting element can be formed on the two arms 60. It is also acceptable to provide one arm 60 and form the wiring layers 82 and 84 in the single arm 60.

In order to thermally isolate the substrate 20 and the support member 40 from each other, two erect posts 72 are provided on a surface of the substrate 20 and a distal end portion 64b of each of the two arms 60 is supported on the corresponding post 72. In this way, the posts 72 enable a hollow section 70 to be provided in a region that includes a space between the substrate 20 and the support member 40. Since the support member 40 is supported on the substrate 20 through posts 72 having a small volume size, the thermal conductance through a heat transfer path leading from the support member 40 to the substrate 20 is small and the dissipation of heat from the infrared absorbing film 32 and the rest of the infrared detecting element 30 can be reduced.

A capacitor 34 includes a first electrode (lower electrode) 34 mounted on the mounting member 50, a second electrode (upper electrode) 34B arranged opposite the first electrodes 34A, and a ferroelectric film 34C serving as a pyroelectric material is arranged between the first and second electrodes 34A and 34B. The first electrode 34A is connected to the wiring layer 82 and the second electrode 34B is connected to the wiring layer 84. The capacitor 34 undergoes spontaneous polarization based on heating caused by infrared radiation and the infrared radiation is detected by extracting an electric charge caused by the spontaneous polarization. Examples of an infrared detecting method include a method of using a mechanical chopper to intermittently interrupt the infrared radiation and detecting a resulting alternating electric polarization phenomenon, and a method of applying a voltage polarized to pull a surface charge in opposition to the spontaneous electric poles and detecting a voltage change across the capacitor occurring in response to the pulled charge after the voltage application is stopped.

A side face and a top face of the capacitor 34 are covered by an electrically insulating film 38 with a hydrogen barrier film 36 in-between for preventing degradation caused by reduction of the ferroelectric film 34C. The infrared absorbing film 32 is formed to cover the electrically insulating film 38. A contact hole (opening) is formed through the hydrogen barrier film 36 and the insulating film 38, and a plug (electrode contact) 90 is embedded in the contact hole. The wiring layer 84 is connected to the second electrode 34B through the plug 90.

The outer surfaces of the infrared detector 10A, which include the infrared absorbing film 32, the support member 40, the wiring layer 80, can be covered with an upper protective film (not shown in the figures) that functions as a mask layer during a manufacturing process in which a sacrificial layer is etched in order to form the hollow section 70. Similarly, a lower protective film (not shown) can be provided on a surface of the substrate 20 that faces the hollow section 70.

1.2. Arm and Wiring Structure of Infrared Detector

In this embodiment, the two arms 60 are arranged in a point symmetrical fashion and have the same shape. Thus, in the explanations that follow, the singular term "arm 60" is used to explain both arms. The arm 60 includes an arm base end section 62 that is connected to a connecting side 62A of the mounting member 50 and an arm body section 64 that extends along an outer contour of the mounting member 50 from the arm base end section 62.

The arm base end section 62 outwardly extends from the mounting member 50 in a first extension direction. In this embodiment, the first extension direction is a direction perpendicular to the connection side 62A, which corresponds to one side of an outline (square shape) of mounting member 50 (e.g., top and bottom edges of the mounting member 50 in FIG. 1). The arm body section 64 extends from the arm base end section 62 in a second extension direction that is parallel to the connection side 62A, which corresponds to one side of an outline (square shape) of mounting member 50. More specifically, the arm body section 64 has a proximal end portion 64a extending from the arm base end section 62 generally along an outer contour of the mounting member 50 with the proximal end portion 64a being spaced apart from an edge of the mounting member 50 in the first direction as shown in FIG. 1. Thus, the second extension direction in which the arm body section 64 extends and the first extension direction in which the arm base end section 62 extends intersect each other (perpendicularly in the example shown in FIG. 1).

The arm body section 64 is configured to have a second width W2 in a direction perpendicular to the first extension direction (lengthwise direction). The arm base end section 62 is configured to have a first width W1 that is oriented in a direction perpendicular to the second extension direction, which is perpendicular to the connection side 62A of the mounting member 50, and wider than the second width W2. In this embodiment, the first width W1 is configured to gradually decrease from a maximum width W1 max at a base end to a minimum width W1 min, where the minimum width W1 min is larger than the second width W2 of the arm body section 64.

It is not necessary to make a region occupied by the arm base end section 62 excessively large. It is preferable for an angular range in which the arm base end section 62 is formed to be less than 90 degrees about a center of the mounting member 50 and for an angular range in which the arm body section 64 is formed to be 90 degrees or larger. In this way, the arm body section 64, which is the dominating contributor to thermal conductance of the support section 40, can be made comparatively long and a low thermal conductance can be ensured.

In this embodiment, since the arm base end section 62 connecting the arm 60 to the mounting member 50 is configured to have a large width, the arm strength at the wide arm base end section 62 can be increased even if the arm body section 64 is made narrow to reduce thermal conductance. For example, even if an external force acts on the arm base end section 62 due to extension and contraction of the arm caused by vibrations or temperature changes, the arm base end section 62 can withstand the external force due to the strength imparted by its larger width and damage can be prevented. As a result, the reliability of the detector 10A is improved.

Since the extension directions of the wider arm base end section 62 and the narrower arm body section 64 (which are perpendicular to the directions of the widths W1 and W2, respectively) intersect each other, the wiring layer 80 is arranged to change directions at an intermediate position and thus is longer than it would otherwise be. As a result, heat dissipation through the wiring layer 80 can be reduced.

In this embodiment, since the two arms 60 have arm body sections 64 that extends along the mounting member 50 from the arm base end sections 62 arranged to be point symmetrical with respect to a center of the mounting member 50, the lengths of the two arms 60 and the wiring layers 82 and 84 can be maximized. Thus, the thermal conductance can be minimized. Furthermore, when the arms extend and contract due to, for example, temperature changes, moments develop which tend to cause the mounting member 50 to rotate in opposite directions in a plan view. Since the opposing rotational moments counteract each other, the infrared detection element 30 on the mounting member 50 will not shift out of position so long as the arm base end sections 62 do not fail.

As shown FIG. 1, the wiring layer 84 connected to the infrared detecting element 30 includes a wider first wiring layer 86 (one example of a wider width portion) arranged in the arm base end section 62 and a narrower second wiring layer 88 (one example of a narrower width portion) that is arranged on the arm body section 64 and connected to the first wiring layer 86.

The wider arm base end section 62 is sufficiently wide to enable the wider first wiring layer 86 to be formed therein, and the narrower arm body section 64 is sufficient to accommodate the narrower second wiring layer 88. Since the thermal conductance of the wiring layer 84 is dominated by the narrower second wiring layer 88, the thermal conductance is increased by the wider first wiring layer 86.

Since the infrared detecting element 30 is laminated onto the mounting member 50, the first wiring layer 86 is arranged over a step-shaped portion 39 between the insulating film 38 and the support member 40. Here, too, the occurrence of a served conductor can be prevented by making the first wiring layer 86 wider.

Figure 3:
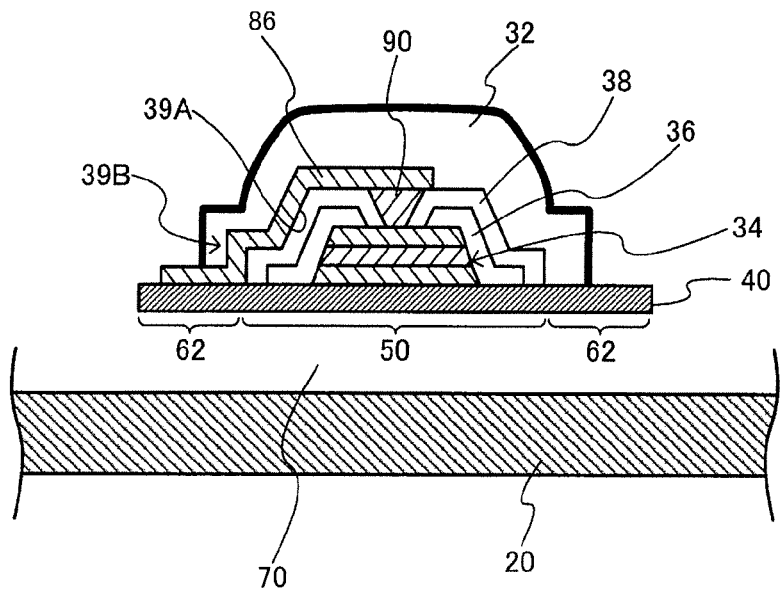
FIG. 3 is a cross sectional view taken along a section line 3-3 of FIG. 1.

More specifically, the infrared detecting element 30 has a multi-layered structure that protrudes from the support member 40 and includes the upper electrode 34B and the insulating film 38, which covers a side face and a top face of the multi-layered structure. An opening is formed through a top face of the insulating film 38 such that the upper electrode 34B is exposed. A plug (electrode contact) 90 is provided such that it fills the opening and connects to the upper electrode 34B. As shown in FIG. 3 the first wiring layer 86 is connected to the electrode contact 90 and extends to the arm base end section 62 through a slanted face 39A on the insulating film 38 and the step-shaped section 39B between the insulating film 38 and the support member 40. By configuring the first wiring layer 86 (which extends to the arm base end section 62 through a slanted face 39A on the insulating film 38 and the step-shaped section 39B between the insulating film 38 and the support member 40) to have a large width, the likelihood of a severance occurring in the first wiring layer 86 can be reduced, particularly in a vicinity of the slanted face 39A and the step-shaped section 39B.

The wiring layer 82 connected to the lower electrode 34A of the infrared detecting element 30 can be configured to be narrow in the arm base end section 62 and the support member 40. It is also acceptable for the wiring layer 82 to have substantially the same surface area as the lower electrode 34A at a lower layer of the lower electrode 34A.

Thus, with this embodiment, a strength of the arm 60 can be increased and dissipation of heat from the arm 60 and the wiring layer can be reduced. Also, since a portion of the wiring layer 84, i.e., the first wiring layer 86, connecting to the infrared detecting element 30 is formed to be wider, a severance of the wiring layer 84 at the slanted face 39A or the step-shaped section 39B can be prevented.

In this embodiment, since the mounting member 50 is square in a plan view, an outline of the infrared detecting element 30 is also square. Since the direction of the wiring can be changed at the arm base end section 62 bulging from the mounting member 50, substantially the entire surface of the mounting member 50 can be occupied by the infrared detecting element 30 and a per-cell light capturing surface area can be increased. As a result, a sensitivity of the detector 10A can be increased.

Figure 7:
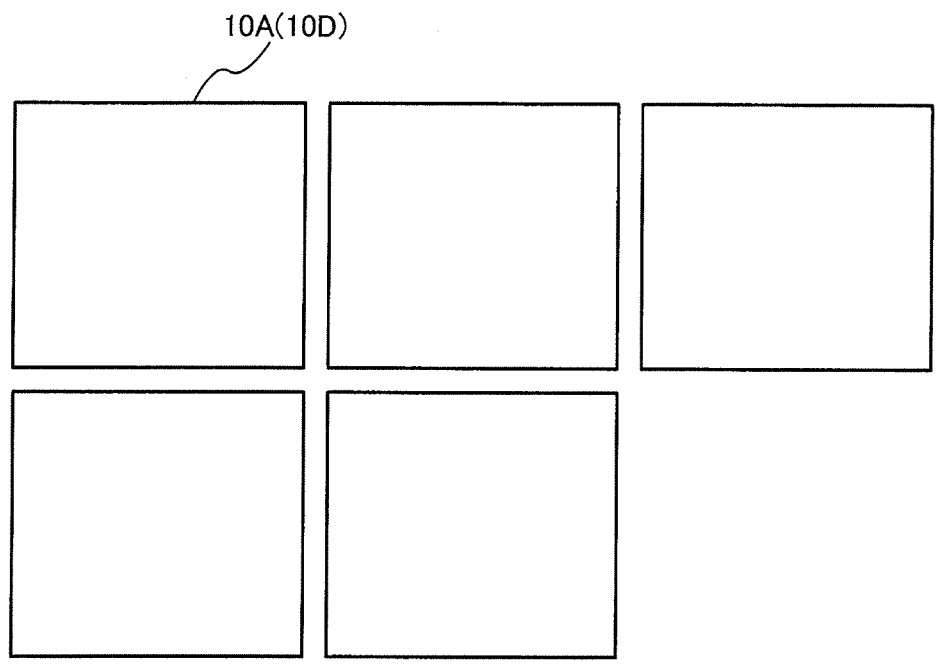
FIG. 7 is a plan view showing a cell arrangement of an infrared detecting device in which infrared detectors according to the first or fourth embodiment of the present invention are arranged in a two-dimensional array.

FIG. 7 shows a cell array of an infrared detecting device in which a plurality of infrared detectors 10A according to the first embodiment, each corresponding to one cell, are arranged in a two-dimensional array along directions parallel to two perpendicular axes Since the external shape of each of the infrared detectors 10A is substantially square, a light (temperature) distribution image can be obtained with an array configuration like that shown in FIG. 7.

2. Second Embodiment

Figure 4:
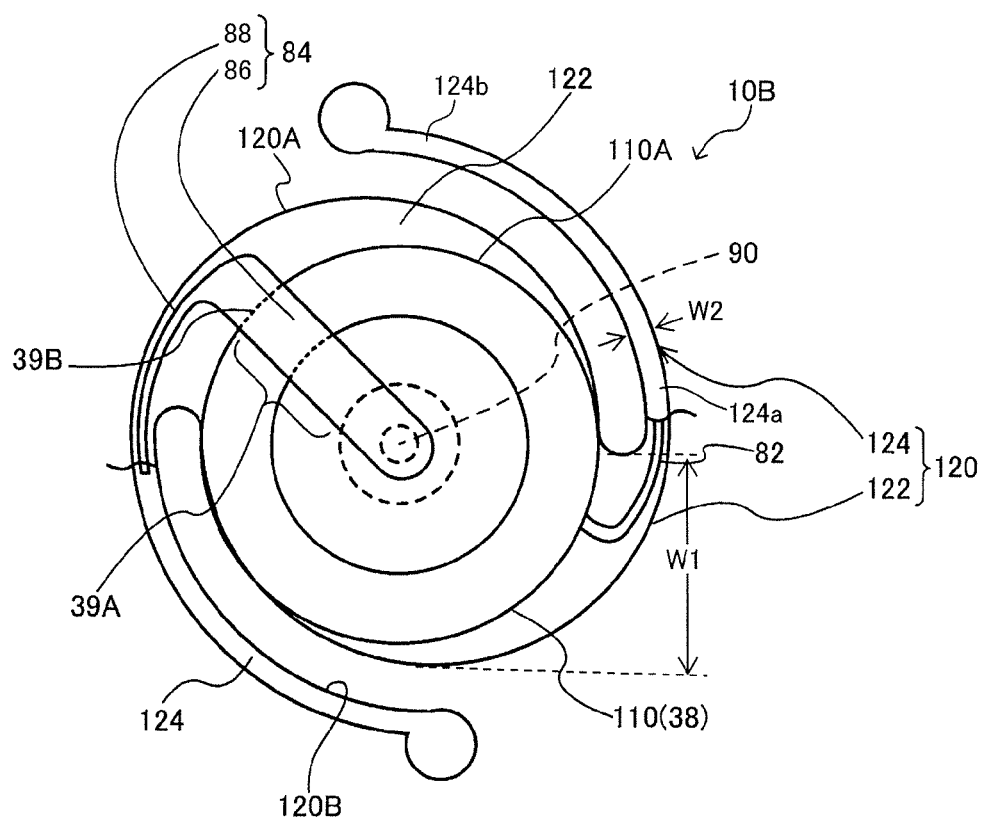
FIG. 4 is a plan view showing a planar layout of a support member and wiring of an infrared detector according to a second embodiment of the present invention.

FIG. 4 is a plan view showing a planar layout of a support member and wiring of an infrared detector 10B according to a second embodiment of the present invention. The details of the substrate 20 and the infrared detecting element 30 are omitted in FIG. 4, but the structure is the same as the first embodiment except that the outline of the infrared detector 10B is circular.

As shown in FIG. 4, a support member 100 includes a mounting member 110 and two arms 120. Each of the arms 120 includes an arm base end section 122 and an arm body section 124. The two arms 120 are positioned such that the arm base end sections 122 are point-symmetrical about a center of the mounting member 110. The arm base end section 122 extends outwardly from the mounting member 110 toward a first direction and the arm base section 122 has a first width W1 measured along a direction perpendicular to the first direction as shown in FIG. 4. The arm body section 124 has a proximal end portion 124a extending from the arm base end section 122 generally along an outer contour of the mounting member 110 with the proximal end portion 124a being spaced apart from an edge of the mounting member 110 in the first direction. The proximal end portion 124a of the arm body section 124 has a second width W2 measured along a direction perpendicular to a lengthwise direction of the arm body section 124 with the second width W2 being narrower than the first width W1 of the arm base end section 124.

In this embodiment, the mounting member 110 includes a curved outline in a plan view. More particularly, in this embodiment, the mounting member 110 is circular. Each of the arms 120 is configured such that the arm body section 124 follows a contour of the circular outline of the mounting member 110 and both an outside outline 120A and an inside outline 120B are curved. The arm base end section 122 is configured to span a wide region between a circular outline 110A of the mounting member 110 and the outside outline 120A of the arm 120.

As a result, similarly to the first embodiment, since the arm base end sections 122 are configured to have a large width, the strength of the arm base end sections 122 can be increased even if the arm body sections 124 are configured to be narrow in order to reduce a thermal conductance. Also, the arm base end section 122 is sufficient to enable the wider first wiring layer 86 to be formed therein, and the narrower arm body section 124 is sufficient to accommodate the narrower second wiring layer 88. By configuring the first wiring layer 86 (which extends to the arm base end section 122 through a slanted face 39A on the insulating film 38 and the step-shaped section 39B between the insulating film 38 and the support member 100) to have a large width, the likelihood of a severance occurring in the first wiring layer 86 can be reduced, particularly in a vicinity of the slanted face 39A and the step-shaped section 39B.

In this embodiment, too, the winder arm base end section 122 and the narrower arm body section 124 are configured to extend in directions perpendicular to their respective width directions. Thus, the arm base end section 122 extends from the outline of the mounting member 110 in a radial direction of the mounting member 110 and the arm body section 124 extends so as to follow the contour of the circular outline of the mounting member 110. Thus, sufficient space can be provided on the arm base end section 122 for changing the directions of the wiring layers 82 and 84.

In this embodiment, since the mounting member 110 is circular in a plan view, an outline of the infrared detecting element 30 is also circular. Since the direction of the wiring can be changed at the arm base end section 122 bulging from the mounting member 110, substantially the entire surface of the mounting member 110 can be occupied by the infrared detecting element 30. In FIG. 4, the circle constituting the outline of the mounting member 110 and the circle constituting the outline of the insulating film 38 of the infrared detecting element 30 overlap each other. Thus, the infrared detecting element 30 can be formed over substantially the entire surface of the mounting member 110 and a per-cell light capturing surface area can be increased. As a result, a sensitivity of the detector 10B can be increased.

This embodiment differs from the first embodiment in that the arm body section 124 of one of the arms 120 includes a portion that extends alongside the arm base end section 122 of the other arm 120. Thus, by configuring the arm body sections 124 to extend in a curved fashion, the thermal conductance of the arm 120 can be reduced.

Figure 8:
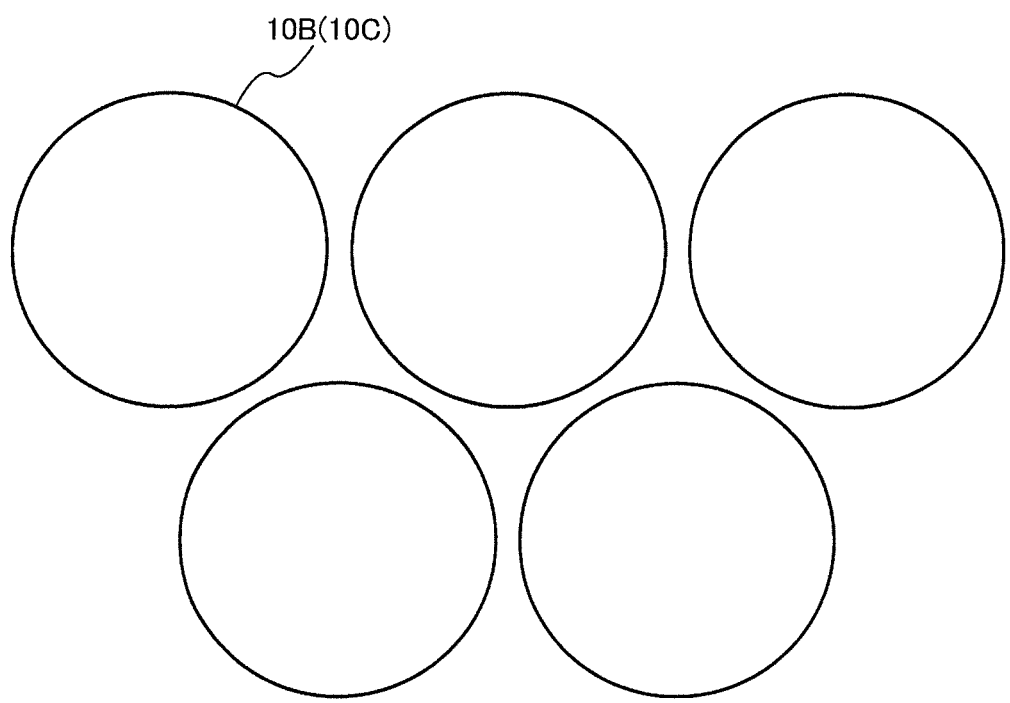
FIG. 8 is a plan view showing a cell arrangement of an infrared detecting device in which infrared detectors according to the second or third embodiment of the present invention are arranged in a two-dimensional array.

FIG. 8 shows a cell array of an infrared detecting device in which a plurality of infrared detectors 10B according to the second embodiment, each corresponding to one cell, are arranged in a two-dimensional array along directions parallel to two perpendicular axes. Since the external shape of each of the infrared detectors 10B is substantially circular, a light (temperature) distribution image can be obtained with an array configuration like that shown in FIG. 8.

3. Third Embodiment

Figure 5:
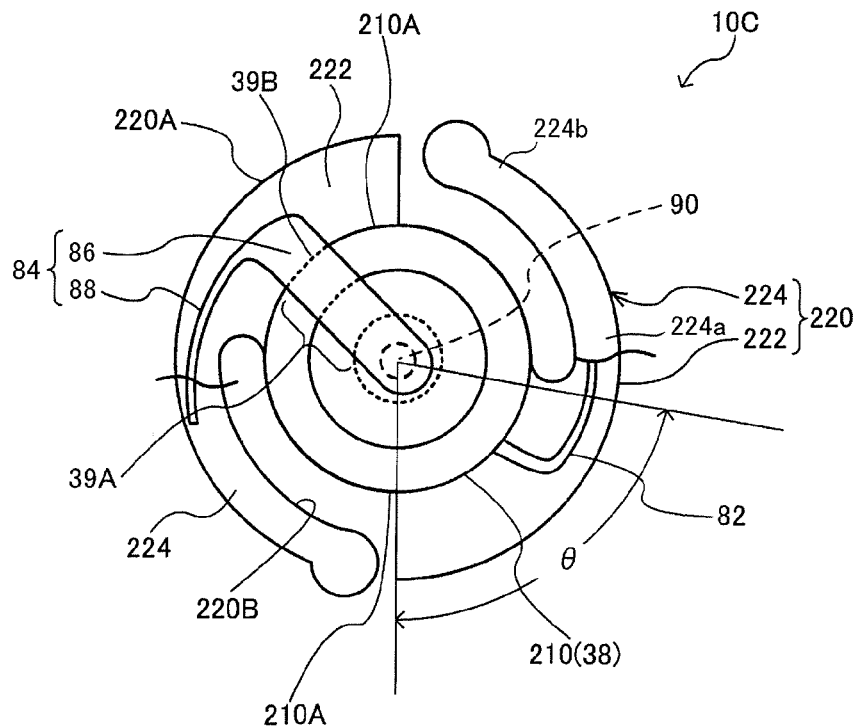
FIG. 5 is a plan view showing a planar layout of a support member and wiring of an infrared detector according to a third embodiment of the present invention.

FIG. 5 is a plan view showing a planar layout of a support member and wiring of an infrared detector 10C according to a third embodiment of the present invention. The details of the infrared detecting element 30 are omitted in FIG. 5, but the structure is the same as the first embodiment except that the outline of the infrared detector 10C is circular.

As shown in FIG. 5, a support member 200 includes a mounting member 210 and two arms 220. Each of the arms 220 includes an arm base end section 222 and an arm body section 224. The two arms 220 are positioned such that the arm base end sections 222 are point-symmetrical about a center of the mounting member 210. As shown in FIG. 5, the arm body section 224 has a proximal end portion 224a extending from the arm base end section 222 generally along an outer contour of the mounting member 210 with the proximal end portion 224a being spaced apart from an edge of the mounting member 210 in the first direction. Also, as shown in FIG. 5, the proximal end portion 224a of the arm body section 224 has a width measured along a direction perpendicular to a lengthwise direction of the arm body section 224 that is narrower than a width of the arm base end section 224 measured in a direction perpendicular to a direction toward which the arm body section 224 extends from the mounting member 210.

In this embodiment, the mounting member 210 includes a curved outline in a plan view. More particularly, in this embodiment, the mounting member 210 is circular. Each of the arms 220 is configured such that the arm body section 224 follows a contour of the circular outline of the mounting member 210 and both an outside outline 220A and an inside outline 220B are curved. The arm base end section 222 is configured to span a wide region between a circular outline 210A of the mounting member 210 and the outside outline 220A of the arm 220.

As a result, similarly to the first and second embodiments, since the arm base end sections 222 are configured to have a large width, the strength of the arm base end sections 222 can be increased even if the arm body sections 224 are configured to be narrow in order to reduce a thermal conductance. Also, the arm base end section 222 is sufficient to enable the wider first wiring layer 86 to be formed therein, and the narrower arm body section 224 is sufficient to accommodate the narrower second wiring layer 88. By configuring the first wiring layer 86 (which extends to the arm base end section 222 through a slanted face 39A on the insulating film 38 and the step-shaped section 39B between the insulating film 38 and the support member 200) to have a large width, the likelihood of a severance occurring in the first wiring layer 86 can be reduced, particularly in a vicinity of the slanted face 39A and the step-shaped section 39B.

In this embodiment, since the mounting member 210 is circular in a plan view, an outline of the infrared detecting element 30 is also circular. Since the direction of the wiring can be changed at the arm base end section 222 bulging from the mounting member 210, substantially the entire surface of the mounting member 210 can be occupied by the infrared detecting element 30. Thus, similarly to the second embodiment, a per-cell light capturing surface area can be increased and a sensitivity of the infrared detector 10C can be increased.

In this embodiment, the arms 220 are particularly configured such that the outside outline 220A (and or the inside outline 220B) is concentric with respect to the circular outline 210A of the mounting member 210. In this way, an infrared detector 10C having a higher surface area efficiency than the second embodiment can be obtained.

This embodiment differs from the first embodiment in that the arm body section 224 of one of the arms 220 includes a portion that extends alongside the arm base end section 222 of the other arm 220. In the plan view of FIG. 5, each of the arm base end sections 222 is configured to occupy an angular range θ of less than 90 degrees with respect to a center of the mounting member 210 and the arm body section 224 is configured to occupy an angular range of at least 90 degrees. Thus, the arms 220 are provided with sufficient length to ensure a small thermal inductance.

FIG. 8 shows a cell array of an infrared detecting device in which a plurality of infrared detectors 10C according to the third embodiment, each corresponding to one cell, are arranged in a two-dimensional array along directions parallel to two perpendicular axes. Since the external shape of each of the infrared detectors 10C is substantially circular, a light (temperature) distribution image can be obtained with an array configuration like that shown in FIG. 8.

4. Fourth Embodiment

Figure 6:
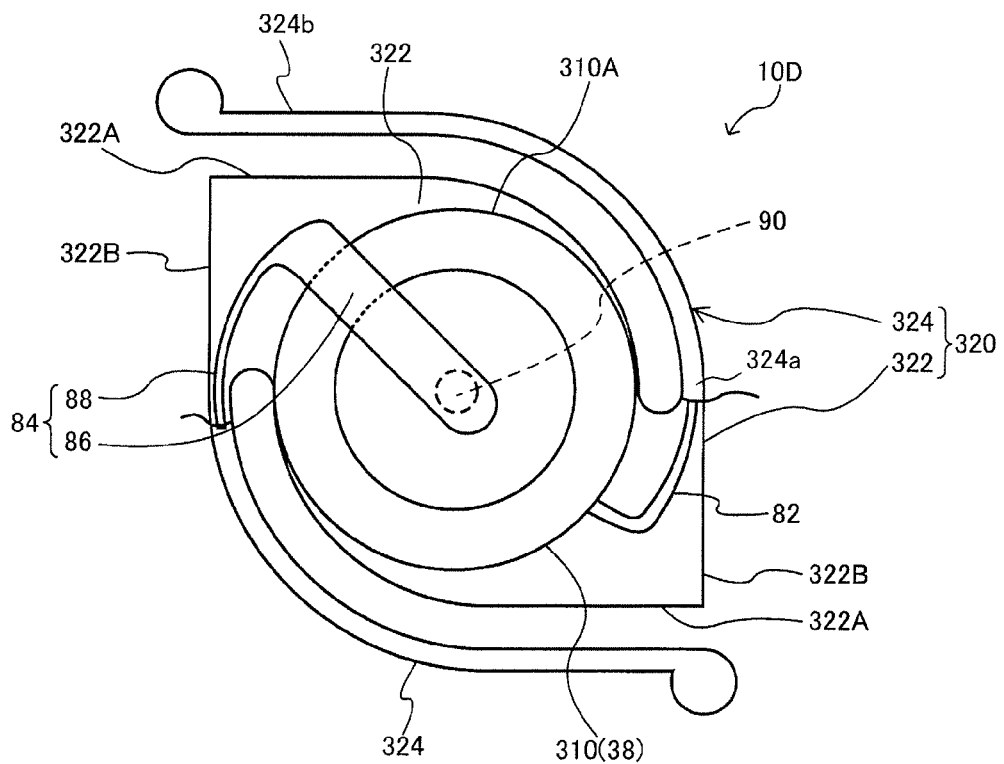
FIG. 6 is a plan view showing a planar layout of a support member and wiring of an infrared detector according to a fourth embodiment of the present invention.

FIG. 6 is a plan view showing a planar layout of a support member and wiring of an infrared detector 10D according to a fourth embodiment of the present invention. The details of the infrared detecting element 30 are omitted in FIG. 6, but the structure is the same as the first embodiment except that the outline of the infrared detector 10D is circular.

As shown in FIG. 6, a support member 300 includes a mounting member 310 and two arms 320. Each of the arms 320 includes an arm base end section 322 and an arm body section 324. The two arms 320 are positioned such that the arm base end sections 322 are point-symmetrical about a center of the mounting member 310. As shown in FIG. 6, the arm body section 324 has a proximal end portion 324a extending from the arm base end section 322 generally along an outer contour of the mounting member 310 with the proximal end portion 324a being spaced apart from an edge of the mounting member 310 in the first direction. Also, as shown in FIG. 6, the proximal end portion 324a of the arm body section 324 has a width measured along a direction perpendicular to a lengthwise direction of the arm body section 324 that is narrower than a width of the arm base end section 324 measured in a direction perpendicular to a direction toward which the arm body section 324 extends from the mounting member 310.

In this embodiment, the mounting member 310 includes a curved outline in a plan view. More particularly, in this embodiment, the mounting member 110 is circular. The arm base end section 322 is configured to span a wide region between a curved outline 310A of the mounting member 310 and outside outline lines 320A and 320B of the arm 320.

As a result, similarly to the first to third embodiments, since the arm base end sections 322 are configured to have a large width, the strength of the arm base end sections 324 can be increased even if the arm body sections 320 are configured to be narrow in order to reduce a thermal conductance. Also, the arm base end section 322 is sufficient to enable the wider first wiring layer 86 to be formed therein, and the narrower arm body section 324 is sufficient to accommodate the narrower second wiring layer 88. By configuring the first wiring layer 86 (which extends to the arm base end section 322 through a slanted face 39A on the insulating film 38 and the step-shaped section 39B between the insulating film 38 and the support member 300) to have a large width, the likelihood of a severance occurring in the first wiring layer 86 can be reduced, particularly in a vicinity of the slanted face 39A and the step-shaped section 39B.

In this embodiment, since the mounting member 310 is circular in a plan view, an outline of the infrared detecting element 30 is also circular. Since the direction of the wiring can be changed at the arm base end section 322 bulging from the mounting member 310, substantially the entire surface of the mounting member 310 can be occupied by the infrared detecting element 30. Thus, similarly to the second embodiment, a per-cell light capturing surface area can be increased and a sensitivity of the infrared detector 10D can be increased.

In this embodiment, differently from the third embodiment, the outside outline of each of the arms 320 includes two straight outline lines 322A and 322B that intersect at the arm base end section 322. Also, the arm body section 324 of the arm 320 has a portion that extends along the outline line 322A, which is one of the two straight outline lines 322A and 322B of the arm 320. Thus, since the arm 320 has a linear portion, the overall length of the arm 320 can be increased and the thermal conductance can be reduced.

FIG. 7 shows a cell array of an infrared detecting device in which a plurality of infrared detectors 10D according to the fourth embodiment, each corresponding to one cell, are arranged in a two-dimensional array along directions parallel to two perpendicular axes Since the external shape of each of the infrared detectors 10D is close to being rectangular, a light (temperature) distribution image can be obtained with an array configuration like that shown in FIG. 7.

5. Electronic Instrument

Figure 9:
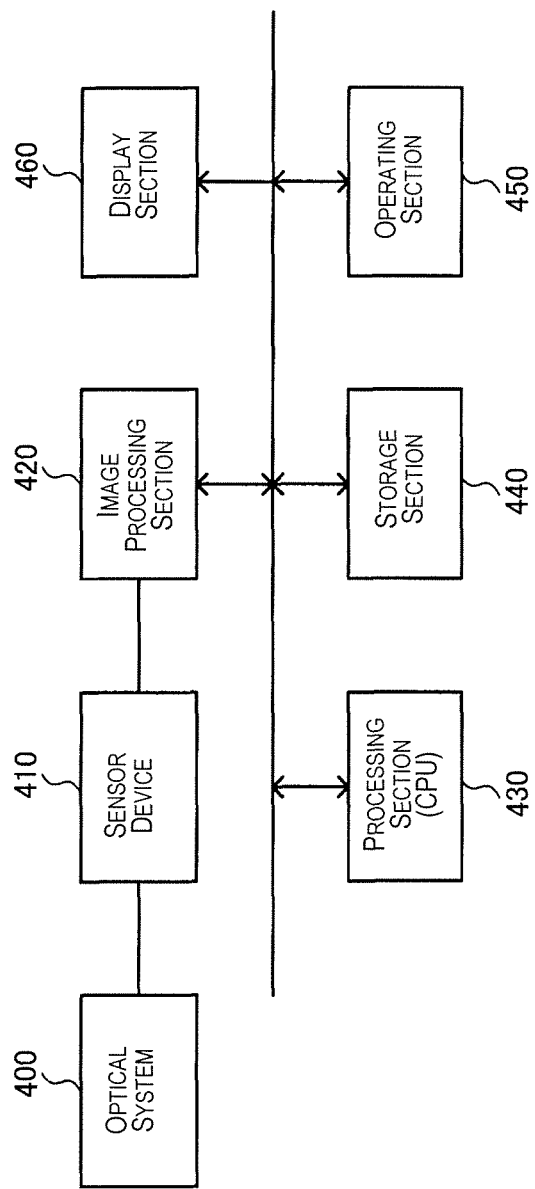
FIG. 9 is a block diagram showing an example of components of an electronic device.

FIG. 9 shows an example of an electronic instrument that includes an infrared detection circuit and sensor device according to any of the previous embodiments. The electronic instrument includes an optical system 400, a sensor device (thermal detecting device) 410, an image processing section 420, a processing section 430, a storage section 440, an operating section 450, and a display section 460. An electronic instrument according to this embodiment is not limited to the features shown in FIG. 9. Various changes can be made. For example, a portion of the components (e.g., the optical system, the operating section, and the display section) can be removed and/or other components can be added.

The optical system 400 includes, for example, one lens or a plurality of lens and a drive section to drive the lens or lenses. The optical system 400 serves to form an image of an object on a sensor device 410. If necessary, it also executes a focus adjustment.

The sensor device 410 comprises a plurality of photodetectors according to one of the previously explained embodiments arranged in a two-dimensional array as shown in FIG. 7 or FIG. 8. Thus, a plurality of rows (word lines or scan lines) and a plurality of columns (data lines) are provided. In addition to the two-dimensional array of photodetectors, the sensor device 410 can include a row selecting circuit (row driver), a read circuit configured to read data from a photodetector through a row line, and an A/D converter section. Image processing of an image of an object can be accomplished by reading data from the photodetectors of the two-dimensional array.

The image processing section 420 executes image revision processing and other image processing based on the digital image data (pixel data) from the sensor device 410.

The processing section 430 controls the entire electronic instrument and controls each block inside the electronic instrument. The processing section 430 comprises, for example, a CPU. The storage section 440 is configured to store various types of information and functions as a work region for the processing section 430 and the image processing section 420. The operating section 450 is an interface through which a user can operate the electronic instrument and comprises, for example, a set of buttons or a GUI (graphical user interface). The display section 460 serves to display a GUI screen or an image acquired by the sensor device 410 and comprises a liquid crystal display, an organic EL display, or another type of display.

A thermal detector corresponding to one cell can be used as an infrared sensor or other sensor and a plurality of thermal detectors each corresponding to one cell can be arranged in a two-dimensional array along directions parallel to two perpendicular axes to form a sensor device (thermal detecting device) 410 capable of providing a heat (light) distribution image. The sensor device 410 can be used to form an electronic instrument, such as a thermographic instrument, a night vision instrument configured to be installed in a vehicle, or a monitoring camera.

One cell or a plurality of cells' worth of thermal detectors can also be used as a sensor in such electronic instruments as an analysis instrument (measuring instrument) configured to analyze (measure) physical information with respect to an object, a security instrument configured to detect a fire or heat, or an FA (factory automation) instrument provided in a factory.

Although several embodiments are described herein, it should be clear to those skilled in the art that many variations can be conceived without departing from the new matter and effects of the present invention in a substantive way. Thus, such variations are included in the scope of the invention. For example, in the specification and the drawings there are some terms that are presented at least once together with other terms that have a broader meaning or the same meaning. Each of these terms can be replaced with the corresponding other term at any location in the specification and drawings.

The present invention can be applied broadly to thermal detectors. The invention is not limited to pyroelectric thermal detectors and can also be applied to bolometric thermal detectors. Also, the detected entity is not limited to infrared radiation and it is acceptable to detect light in other wavelength regions.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:
1. A thermal detector comprising:
   a thermal detecting element;
   a support member supporting the thermal detecting element, the support member having a mounting member on which the thermal detecting element is mounted and a first arm member connected to the mounting member with the first arm member having
      an arm base end section extending outwardly from the mounting member toward a first direction, the arm base section having a first width measured along a direction perpendicular to the first direction, and an arm body section having a proximal end portion extending from the arm base end section generally along an outer contour of the mounting member with the proximal end portion being spaced apart from an edge of the mounting member in the first direction, the proximal end portion of the arm body section having a second width measured along a direction perpendicular to a lengthwise direction of the arm body section with the second width being narrower than the first width of the arm base end section; and a wiring layer formed on the mounting member and the first arm member and connected to the thermal detecting element, the wiring layer including a wider width portion connected to the thermal detecting element and arranged on the arm base end section, and a narrower width portion connected to the wider width portion, arranged on the arm body section, and having a width narrower than a width of the wider width portion.

2. The thermal detector of claim 1, further comprising a substrate supporting a distal end portion of the arm body section of the first arm member such that a hollow section is formed between the substrate and the support member.

3. The thermal detector of claim 1, further comprising a second arm member, the wiring layer being provided at least on the first arm member.

4. The thermal detector of claim 3, wherein the second arm member having an arm base end section extending from the mounting member and disposed in such a position as to be point symmetrical from the arm base end section of the first arm member with respect to a center of the mounting member.

5. The thermal detector of claim 1, wherein the thermal detecting element includes a multi-layer structure protruding from the support member and including an upper electrode, an insulating film covering a portion of the support member and a side surface and a top surface of the multi-layer structure and having an opening formed in the top surface so as to expose the upper electrode, and an electrode contact filling the opening and connecting to the upper electrode, the wider width portion being connected to the electrode contact and extending to the arm base end section of the first arm member through a slanted surface of the insulating film and a step-shaped section between the insulating film and the support member.

6. The thermal detector of claim 1, wherein the mounting member has a polygonal shape with at least four sides in a plan view, the arm base end section of the first arm member extends perpendicular to one side of the polygonal shape, and the proximal end portion of the arm body section of the first arm member extends in a direction parallel to the one side of the polygonal shape.

7. The thermal detector of claim 1, wherein the mounting member has an curved outline in a plan view, and the arm base end section of the first arm member has a wide region having the first width so that the wide region spans between the curved outline of the mounting member and an outside outline of the first arm member.

8. An electronic instrument comprising the thermal detector according to claim 3.

9. The thermal detector of claim 4, wherein the mounting member at least partially has a curved outline in a plan view, the arm base end section of the first arm member has a wide region having the first width so that the wide region spans between the curved outline of the mounting member and an outside outline of the first arm member, and the arm body section of the second arm member includes a portion extending generally along an outline of the arm base end section of the first arm member.

10. The thermal detector of claim 9, wherein the outside outline of the first arm member includes two straight lines that intersect at the arm base end section, and the arm body section of the second arm member has a portion extending generally along one of the two straight lines of the outside outline of the first arm member.

11. A thermal detecting device comprising a plurality of the thermal detectors according to claim 1 arranged in a two-dimensional array along directions parallel to two perpendicular axes.

12. An electronic instrument comprising the thermal detector according to claim 1.

13. An electronic instrument comprising the thermal detecting device according to claim 11.

14. A thermal detecting device comprising a plurality of the thermal detectors according to claim 2 arranged in a two-dimensional array along directions parallel to two perpendicular axes.

15. An electronic instrument comprising the thermal detector according to claim 2.

16. An electronic instrument comprising the thermal detecting device according to claim 14.

17. A thermal detecting device comprising a plurality of the thermal detectors according to claim 3 arranged in a two-dimensional array along directions parallel to two perpendicular axes.

18. A thermal detector comprising:

a thermal detecting element;

a support member supporting the thermal detecting element, the support member having a mounting member on which the thermal detecting element is mounted and a first arm member connected to the mounting member with the first arm member having an arm base end section extending outwardly from the mounting member toward a first direction, the arm base section having a first width measured along a direction perpendicular to the first direction, and an arm body section having a proximal end portion extending from the arm base end section generally along an outer contour of the mounting member with the proximal end portion being spaced apart from an edge of the mounting member in the first direction, the proximal end portion of the arm body section having a second width measured along a direction perpendicular to a lengthwise direction of the arm body section with the second width being narrower than the first width of the arm base end section; and a wiring layer formed on the mounting member and the first arm member and connected to the thermal detecting element, the mounting member having a circular outline in a plan view, the outside outline of the first arm member and the circular outline of the mounting member being concentric with each other.

19. The thermal detector of claim 18, wherein
an angular range in which the arm base end section is formed with respect to a center of the mounting member in the plan view is less than 90 degrees.

* * * * *